W. Bell,
Sawing Shingles.
№ 941. Patented Sep. 22, 1838.

UNITED STATES PATENT OFFICE.

WILLIAM BELL, OF LEXINGTON, KENTUCKY.

MACHINE FOR SAWING SHINGLES AND STAVES.

Specification of Letters Patent No. 941, dated September 22, 1838.

*To all whom it may concern:*

Be it known that I, WILLIAM BELL, of the city of Lexington and State of Kentucky, have invented a new and useful Saw-mill for Cutting or Making Shingles or Staves; and I do hereby declare that the following is a full and exact description.

The chief merit of this invention consists in its cutting the blocks of wood to a proper and uniform length, and so conducting them to the saw, that the shingles or staves are cut off from the surface of the blocks, by moving the saw in cutting longitudinally, or with the grain of the wood.

Figure 1:
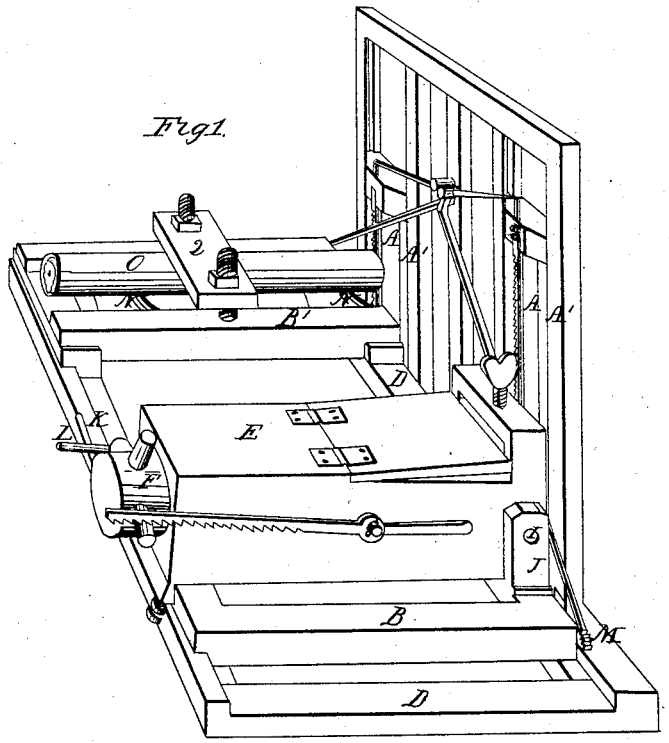
Figure 2:
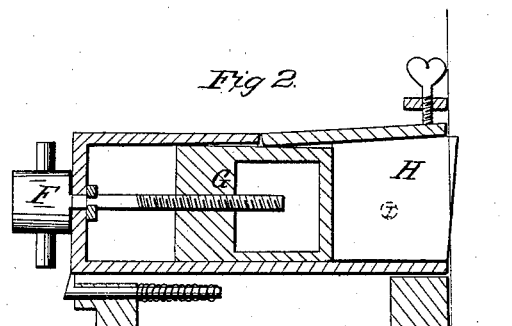

The saw is made and placed in a saw gate in the same way that saws A, A, and saw gates A', A', Fig. 1 have been made and used generally, and the crank is the same generally used in such mills, with the exception of the manner of fastening the saw in the gate, in this that the plane of the saw is parallel to the plane of the saw gate, and the saw is placed out in front of the gate fully the thickness of a shingle or stave, and is so fastened that the distance from the line in front of the gate can be increased or diminished to suit the desired thickness of the shingle or stave. The carriage B for conducting the blocks of wood to the saw, is placed upon a stationary frame D, D, and moves upon rollers which are fastened to the stationary frame. The carriage and stationary frame are placed on the side of the saw gate, one end of the saw gate terminating near the saw, and beyond the back of the saw, and the other extending from it, parallel to a line drawn from the back to the teeth of the saw, sufficiently far to make the teeth clear the fender posts, which hold the saw gate, in order to put new blocks in the box hereafter described, the side of the carriage passing almost in contact with the saw. Upon the top and in front of the carriage B is fastened to the carriage a box E extending from one side to the other of the carriage at right angles to the line in which the carriage moves, and to the line drawn from the back to the front of the saw, the end of which next the saw is open and passes with the movements of the carriage almost in contact with the saw—through the other end of which passes a screw Figs. 1 and 2 which drives backward and forward a piece of wood or an interior frame G filling entirely and alternately either end of the box. In the open end of the box next to the saw is placed the block of wood H out of which the staves or shingles are to be made, in a perpendicular direction, the grain of the blocks running at right angles to the open end of the box, and exactly parallel to the line of the teeth of the saw when in motion. The end of the box next to the saw is supported by hinges or pivots as shown at I in the sides fastened to upright pieces J which rest on the carriage. The other end rests on the carriage and is elevated or depressed by levers K and L so as to place the top or bottom of the block alternately farther within the line of the saw, and so cuts the thick end of the shingle alternately, from the top and bottom of the block. The wood or frame moving within the box, by means of the screw or lever in the end of the box, drives forward the block after each shingle or stave is cut off, to the distance of the thickness of the shingle or stave and is regulated as to the distance of each of its movements by means of an index or gage on one side of the box, connected with the wood or frame on the inside of the box. The blocks from which the shingles are cut off, are cut to a uniform length being any desired length for the shingles, before they are put into the box. They are kept firmly in their place by means of small sharp pointed nails, fastened into that part of the wood or movable frames, within the box, which comes in contact with the ends of the blocks at the top and bottom, and ranging laterally with the sides of the box, so that the blocks on being pushed out at the open end of the box, will be held in place and guided straight by means of these edges which are slightly pressed into the ends of the blocks at top and bottom. The carriage is moved forward, either by weights or a rag wheel M. The stroke of the saw, and longitudinal direction of the blocks, being always in the same direction, or not farther from parallel than an angle or 45° may be either horizontal or perpendicular.

Two saws may be fastened on opposite sides of the same gate, requiring two carriages; and any number of cranks fixed on the same axle, and any number of saws and gates driven by a succession of cranks on the same axle—and an indefinite number of boxes to hold the blocks from which the shingles are sawed—may be attached to the same carriage.

Figure 3:
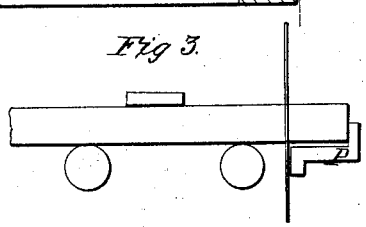

That part of the machinery which is intended to cut the blocks of wood of any desired length, consists in a stationary frame, carriage, saws, and saw gate of the same description as above, and only varies from it in this:—That in place of the box to hold the block, a frame B' is placed in the carriage with rollers N, N, at bottom, ranging laterally with the direction in which the carriage moves—upon which rollers the log O is placed at right angles to the front of the saw gate and the course of the carriage when moving, passing through the saw gate in front of the teeth of the saw until stopped by a piece of stationary wood P Fig. 3 used as a gage up to which the log moves over the rollers, fastened down and held tight upon the rollers by a screw or lever pressure 2, while the saw is cutting and again moved forward past the saw after one length is cut until stopped by the gage. This log frame may be attached to the same carriage on which the box is placed, or may be on a separate one.

The improvements, of which I claim to be the inventor are the following in combination with each other:

The manner of applying the saw to the gate—the manner of bringing the blocks of wood in contact with the teeth of the saw—the manner of fastening the blocks in the box upon the carriage—the manner of alternately cutting the thick end of the shingle from the opposite ends of the blocks by elevating or depressing the ends of the box opposite to the block—the manner of regulating the uniform thickness of the shingle—and the manner of fastening or holding in place the blocks while they are being cut, all as above described.

WM. BELL.

Witnesses:
  JNO. M. MCCALLA,
  C. W. CLOUD.